United States Patent
Ophir et al.

(10) Patent No.: US 7,327,763 B2
(45) Date of Patent: Feb. 5, 2008

(54) FORWARD COMPATIBILITY HOOKS FOR DFS AND TPC FOR WLAN

(75) Inventors: Lior Ophir, Herzlia (IL); Artur Zaks, Modiin (IL)

(73) Assignee: Texas Instruments Incorporated, Dallas, TX (US)

( * ) Notice: Subject to any disclaimer, the term of this patent is extended or adjusted under 35 U.S.C. 154(b) by 840 days.

(21) Appl. No.: 10/781,509

(22) Filed: Feb. 18, 2004

(65) Prior Publication Data

US 2004/0179549 A1    Sep. 16, 2004

Related U.S. Application Data

(60) Provisional application No. 60/448,577, filed on Feb. 19, 2003.

(51) Int. Cl.
*H04J 3/24*    (2006.01)
(52) U.S. Cl. ............................................... 370/474
(58) Field of Classification Search ................. 370/474
See application file for complete search history.

(56) References Cited

OTHER PUBLICATIONS

IEEE 802.11h standard, Oct. 14, 2003.*

* cited by examiner

*Primary Examiner*—Seema S. Rao
*Assistant Examiner*—Wanda Z Russell
(74) *Attorney, Agent, or Firm*—Wade James Brady, III; Frederick J. Telecky, Jr.

(57) ABSTRACT

A method provides forward compatibility hooks for DFS and TPC for WLAN, so that the same mechanisms can be employed (with only minor changes/additions) for other regulatory domains, other bands, and/or other purposes. The current IEEE 802.11 h standard defines mechanisms for dynamic frequency selection (DFS) and transmit power control (TPC) that may be used to satisfy regulatory requirements for operation in the 5 GHz band in Europe. The present method provides a format to allow other bands, and relates to the supported channels element, channel switch announcement element, and the Basic/CCA/RPI histogram request/report. The method optionally reserves more than 3-bits in the Basic report (Map subfield).

43 Claims, 5 Drawing Sheets

FORWARD COMPATIBILITY HOOKS FOR DFS AND TPC FOR WLAN

CLAIM TO PRIORITY OF PROVISIONAL APPLICATION

This application claims priority under 35 U.S.C. § 119(e)(1) of provisional application Ser. No. 60/448,577, entitled Forward Compatibility Hooks For 802.11h, filed Feb. 19, 2003, by Lior Ophir.

BACKGROUND OF THE INVENTION

1. Field of the Invention

This invention relates generally to digital communication systems and methods, and more particularly to a technique of extending the supported channel element, and all related DFS formats, for the IEEE 802.11 standard.

2. Description of the Prior Art

The IEEE 802.11h standard defines mechanisms for dynamic frequency selection (DFS) and transmit power control (TPC) that may be used to satisfy regulatory requirements for operation of wireless LAN (WLAN) in the 5 GHz band in Europe. Section 11.5, directed to TPC, states "The procedures may also satisfy comparable needs in other regulatory domains and other frequency bands and may be useful for other purposes, such as interference reduction, range control and power consumption reduction." Section 11.6, directed to DFS, states "The procedures may also satisfy comparable needs in other regulatory domains and frequency bands and may be useful for other purposes." Some definitions however, are currently very specific to the 5 GHz band in Europe, and therefore are difficult to extend.

In view of the foregoing, it would be both advantageous and beneficial to provide forward compatibility hooks within 802.11h, so that the same mechanisms can be employed (with only minor changes/additions) for other regulatory domains, other bands, and/or other purposes.

SUMMARY OF THE INVENTION

The present invention is directed to a method of providing forward compatibility hooks within IEEE 802.11h, so that the same mechanisms can be employed (with only minor changes/additions) for other regulatory domains, other bands, and/or other purposes. The current IEEE 802.11h standard defines mechanisms for dynamic frequency selection (DFS) and transmit power control (TPC) that may be used to satisfy regulatory requirements for operation in the 5 GHz band in Europe. The present method provides a format to allow other bands, and relates to the supported channels element, channel switch announcement element, and the Basic/CCA/RPI histogram request/report. The method optionally reserves more than 3-bits in the Basic report (Map subfield). These extensions may be part of 802.11h or any other future standard that enhances the capabilities defined by 802.11h. The extensions may be relevant for example to support DFS and/or TPC for WLAN in the 2.4 GHz ISM band.

BRIEF DESCRIPTION OF THE DRAWINGS

Other aspects and features of the present invention and many of the attendant advantages of the present invention will be readily appreciated as the invention becomes better understood by reference to the following detailed description when considered in connection with the accompanying drawing figures thereof and wherein.

While the above-identified drawing figures set forth particular embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

The preferred embodiments described herein below are directed to a method of providing forward compatibility hooks within IEEE 802.11h, so that the same mechanisms can be employed (with only minor changes/additions) for other regulatory domains, other bands, and/or other purposes. The current IEEE 802.11h standard defines mechanisms for dynamic frequency selection (DFS) and transmit power control (TPC) that may be used to satisfy regulatory requirements for operation in the 5 GHz band in Europe. The present method provides a format to allow other bands, and relates to the supported channels element, channel switch announcement element, and the Basic/CCA/RPI histogram request/report. The method optionally reserves more than 3-bits in the Basic report (Map subfield).

Figure 1:
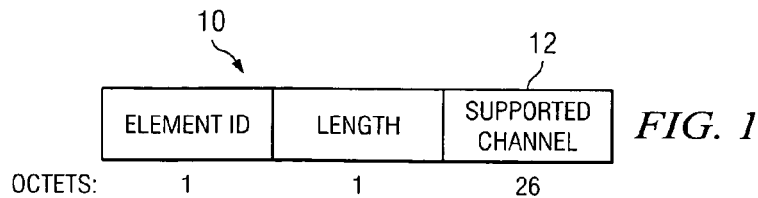
FIG. 1 is a diagram illustrating the current IEEE 802.11h supported channels element format.

Looking now at FIG. 1, a diagram illustrates the current IEEE 802.11h standard supported channels element 10 format. The supported channels element 10 can be seen to employ a 26 byte supported channels field 12. These bytes are currently used to map 200 channels in the 5 GHz band.

According to one embodiment of the present invention, the same format of the supported channels element can be used in other bands, for example in the 2.4 GHz ISM band. In that case the supported channels element 10 employs the same 26 byte supported channels field 12. These bytes are used to map channels in the new band, for example the 2.4 GHz band.

Figure 2:
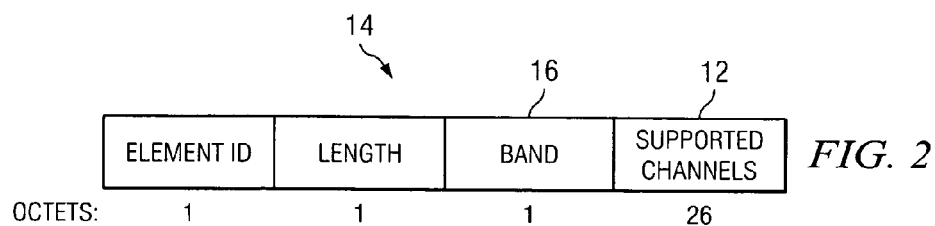
FIG. 2 is a diagram illustrating the supported channels element format according to one embodiment of the present invention.

FIG. 2 is a diagram illustrating a supported channels element 14 format according to one embodiment of the present invention. The supported channels element 14 has a "Band Field" 16 that indicates the band to which the supported channels field 12 refers. Most preferably, only the value "5" is allows this field (indicating the 5 GHz) band; while all other values are reserved. Other options also exist for indicating which band is used, for example by numbering different channels in different bands with different indices.

Figure 3:
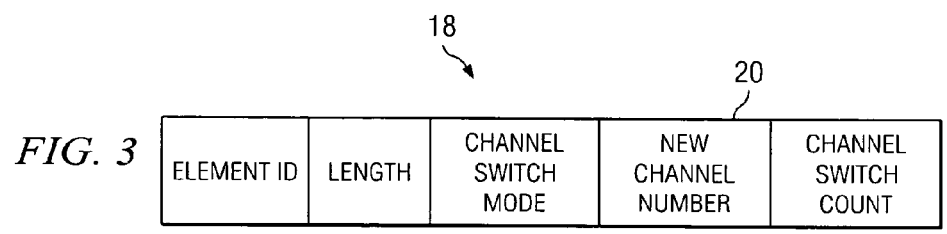
FIG. 3 is a diagram illustrating the current IEEE 802.11h channel switch announcement element format.

FIG. 3 is a diagram illustrating the current IEEE 802.11h standard channel switch announcement element 18 format. The channel switch announcement element 18 has a 1 octet channel number field 20. Although the channel number field 20 theoretically may indicate 256 channels, only 200 channels are used in the 5 GHz band.

According to one embodiment of the present invention, the same format of the channel switch announcement element can be used in other bands, for example in the 2.4 GHz ISM band. In that case the 1 octet channel number field 20 is used to map channels in the new band, for example the 2.4 GHz band.

Figure 4:
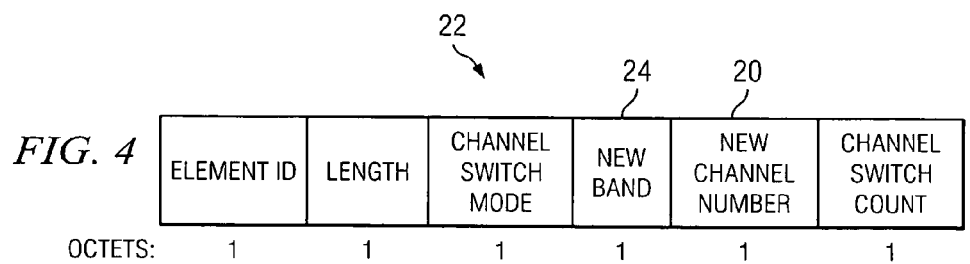
FIG. 4 is a diagram illustrating the channel switch announcement element format according to one embodiment of the present invention.

FIG. 4 is a diagram illustrating channel switch announcement element 22 format according to one embodiment of the present invention. The channel switch announcement element 22 includes a "New Band" field 24 (1 octet) indicating the band to which the new channel number field 20 refers.

Figure 5:
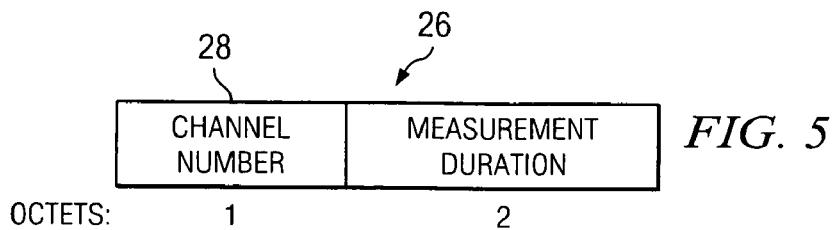
FIG. 5 is a diagram illustrating the current IEEE 802.11h basic request format.

FIG. 5 is a diagram illustrating the current IEEE 802.11h standard basic request 26 format. The basic request 26 format can be seen to use 1 octet for the channel number field 28. Although the channel number field 28 may theoretically indicate 256 channels, only 200 channels are used in the 5 GHz band.

According to one embodiment of the present invention, the same format of the basic request can be used in other bands, for example in the 2.4 GHz ISM band. In that case the 1 octet channel number field 28 is used to map channels in the new band, for example the 2.4 GHz band.

Figure 6:
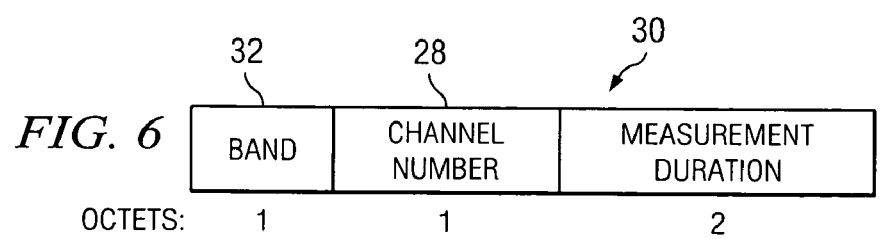
FIG. 6 is a diagram illustrating a basic request format according to one embodiment of the present invention.

FIG. 6 is a diagram illustrating a basic request 30 format according to one embodiment of the present invention. Basic request 30 can be seen to have a "Band" field 32 that indicates the band to which the channel number field 28 refers. Most preferably, only the value "5" is allowed for this field 30 (indicating the 5 GHz band); while all other values are reserved.

Figure 7:
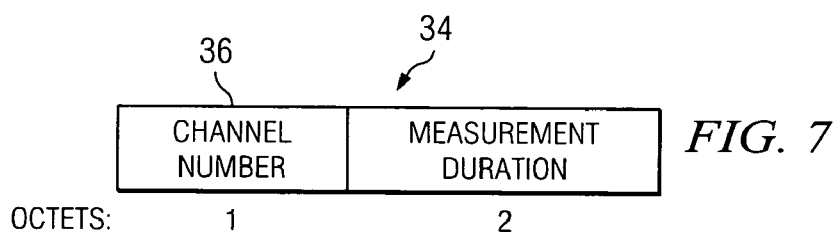
FIG. 7 is a diagram illustrating the current IEEE 802.11h CCA request format.

FIG. 7 is a diagram illustrating the current IEEE 802.11h standard CCA request 34 format. CCA request 34 uses a single octet for its channel number field 36. Although the channel number field 36 may theoretically indicate 256 channels, this is sufficient since only 200 channels are used in the 5 GHz band.

According to one embodiment of the present invention, the same format of the CCA request can be used in other bands, for example in the 2.4 GHz ISM band. In that case the 1 octet channel number field 36 is used to map channels in the new band, for example the 2.4 GHz band.

Figure 8:
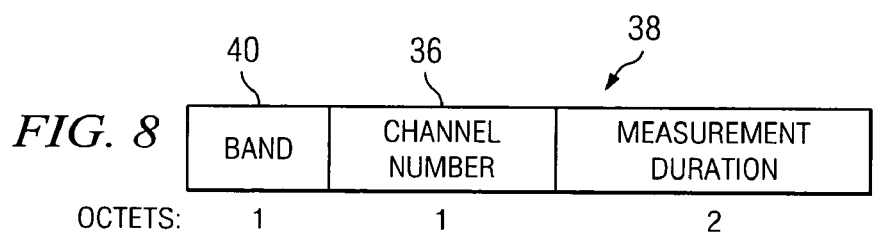
FIG. 8 is a diagram illustrating a CCA request format according to one embodiment of the present invention.

FIG. 8 is a diagram illustrating a CCA request 38 format according to one embodiment of the present invention. CCA request 38 can be seen to also include a 1 octet "Band" field 40 indicating the band to which the channel number field 36 refers. Most preferably, only the value "5" is allowed for this field (indicating the 5 GHz band); while all other values are reserved.

Figure 9:
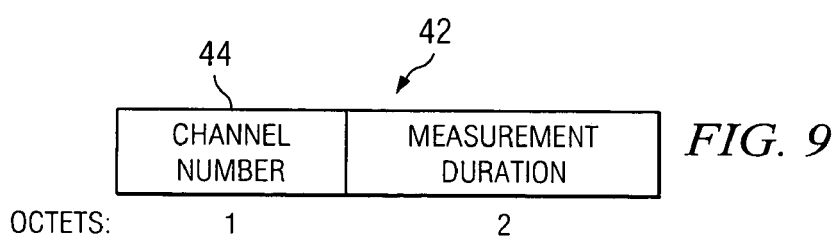
FIG. 9 is a diagram illustrating the current IEEE 802.11h RPI histogram request format.

FIG. 9 is a diagram illustrating the current IEEE 802.11h standard RPI histogram request 42 format. A single octet is used for the channel number field 44 that theoretically may indicate only 256 channels. As stated herein before, this is sufficient since only 200 channels are used in the 5 GHz band.

According to one embodiment of the present invention, the same format of the RPI histogram request can be used in other bands, for example in the 2.4 GHz ISM band. In that case the 1 octet channel number field 44 is used to map channels in the new band, for example the 2.4 GHz band.

Figure 10:
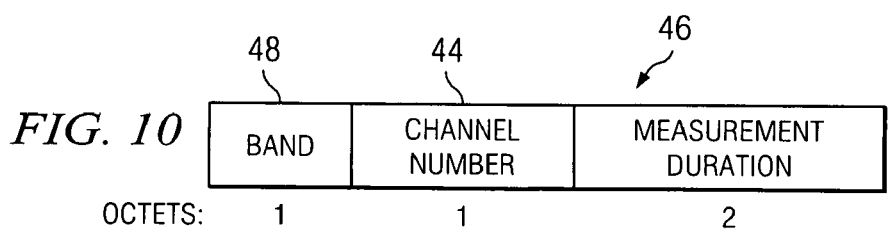
FIG. 10 is a diagram illustrating a RPI histogram request format according to one embodiment of the present invention.

FIG. 10 is a diagram illustrating a RPI histogram request 46 format according to one embodiment of the present invention. RPI histogram request 46 has a "Band" field 48 indicating the band to which the channel number field 44 refers. Most preferably, only the value "5" is allowed for this field 42 (indicating the 5 GHz band); while all other values are reserved.

Figure 11:
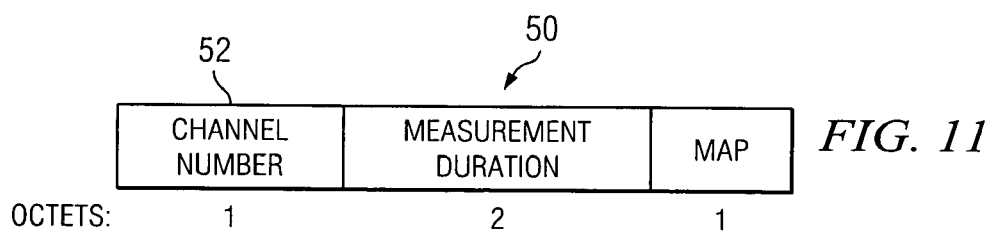
FIG. 11 is a diagram illustrating the current IEEE 802.11h basic response format.

FIG. 11 is a diagram illustrating the current IEEE 802.11h standard basic response 50 format. One octet is used for the channel number field 52 that may indicate 256 channels. As already stated above, this is sufficient since only 200 channels are used in the 5 GHz band.

According to one embodiment of the present invention, the same format of the basic response can be used in other bands, for example in the 2.4 GHz ISM band. In that case the 1 octet channel number field 52 is used to map channels in the new band, for example the 2.4 GHz band.

Figure 12:
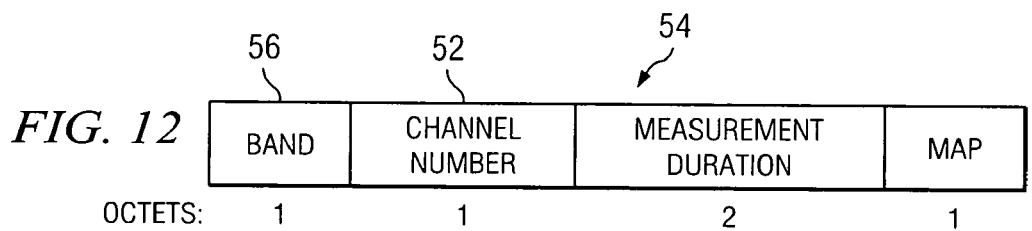
FIG. 12 is a diagram illustrating a basic response format according to one embodiment of the present invention.

FIG. 12 is a diagram illustrating a basic response 54 format according to one embodiment of the present invention. Basic response 54 includes a 1 octet "Band" field 56 to which the channel number field 52 refers. Most preferably, only the value "5" is allowed for this field 56 (indicating the 5 GHz band); while all other values are reserved.

Figure 13:
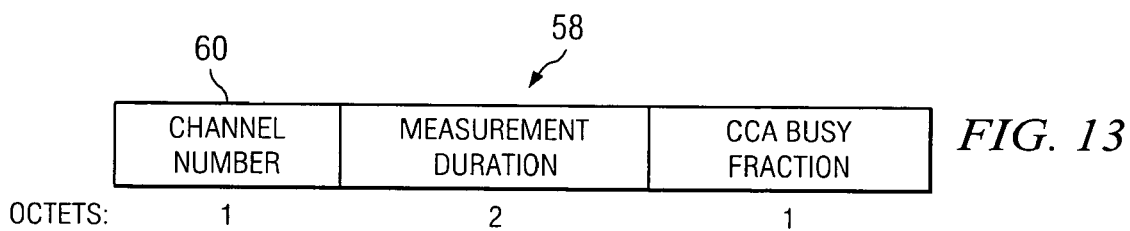
FIG. 13 is a diagram illustrating the current IEEE 802.11h CCA response format.

FIG. 13 is a diagram illustrating the current IEEE 802.11h standard CCA response 58 format. One octet is used for the channel number field 60 that may indicate 256 channels (used for 200 channels in the 5 GHz band).

According to one embodiment of the present invention, the same format of the CCA response can be used in other bands, for example in the 2.4 GHz ISM band. In that case the 1 octet channel number field 60 is used to map channels in the new band, for example the 2.4 GHz band.

Figure 14:
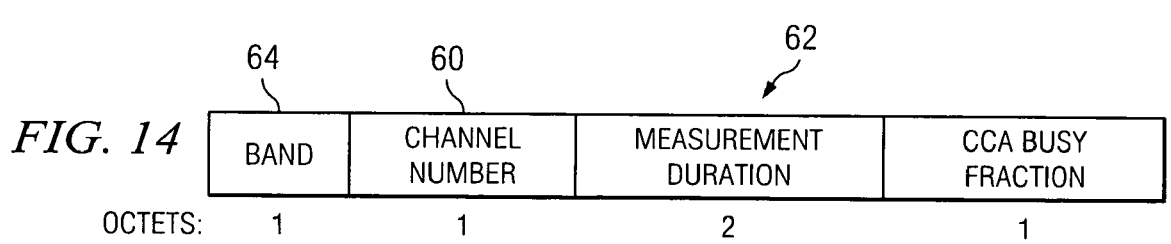
FIG. 14 is a diagram illustrating a CCA response format according to one embodiment of the present invention.

FIG. 14 is a diagram illustrating a CCA response 62 format according to one embodiment of the present invention. CCA response 62 has a 1 octet "Band" field 64 indicating the band to which the channel number field 60 refers. As with other fields described herein before, only the value "5" most preferably is allowed for this field 64 (indicating the 5 GHz band); while all other values are reserved.

Figure 15:
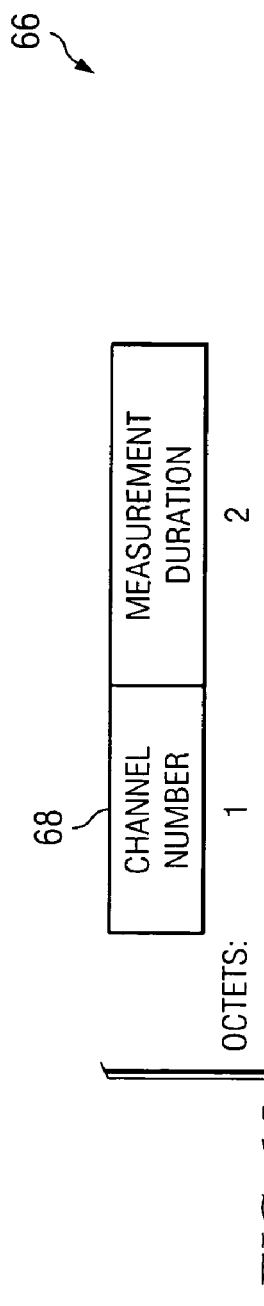
FIG. 15 is a diagram illustrating the current IEEE 802.11h RPI histogram response format.

FIG. 15 is a diagram illustrating the current IEEE 802.11h standard RPI histogram response 66 format. One octet is used for the channel number field 68 that may indicate 256 channels (used for 200 channels in the 5 GHz band).

According to one embodiment of the present invention, the same format of the RPI histogram response can be used in other bands, for example in the 2.4 GHz ISM band. In that case the 1 octet channel number field 68 is used to map channels in the new band, for example the 2.4 GHz band.

Figure 16:
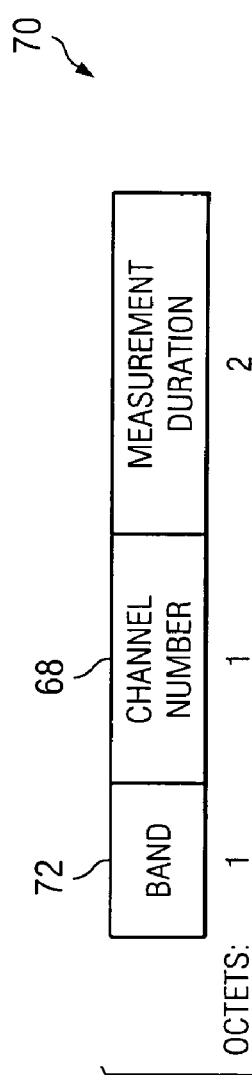
FIG. 16 is a diagram illustrating a RPI histogram response format according to one embodiment of the present invention.

FIG. 16 is a diagram illustrating a RPI histogram response 70 format according to one embodiment of the present invention. RPI histogram response 70 has a 1 octet "Band" field 72 indicating the band to which the channel number field 68 refers. As with other fields described herein before, only the value "5" most preferably is allowed for this field 72 (indicating the 5 GHz band); while all other values are reserved.

Figure 17:
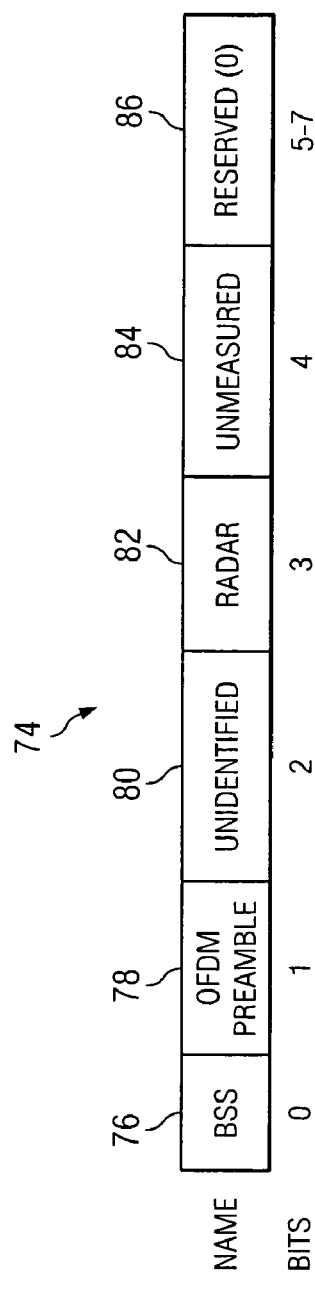
FIG. 17 is a diagram illustrating the current IEEE 802.11h Basic report (Map field)

FIG. 17 is a diagram illustrating the current IEEE 802.11h standard Basic report (Map field) 74. Five bits are used for indications (BSS 76, OFDM Preamble 78, Unidentified 80, Radar 82, Unmeasured 84); while only 3-bits 86 are left for future indications.

According to one embodiment of the present invention, the same format of the basic report can be used in other bands, for example in the 2.4 GHz ISM band. In that case the bits used for indications (76, 78, 80, 82, 84) and the reserved 3 bits 86 can be used for indications in the new band, for example the 2.4 GHz band.

Figure 18:
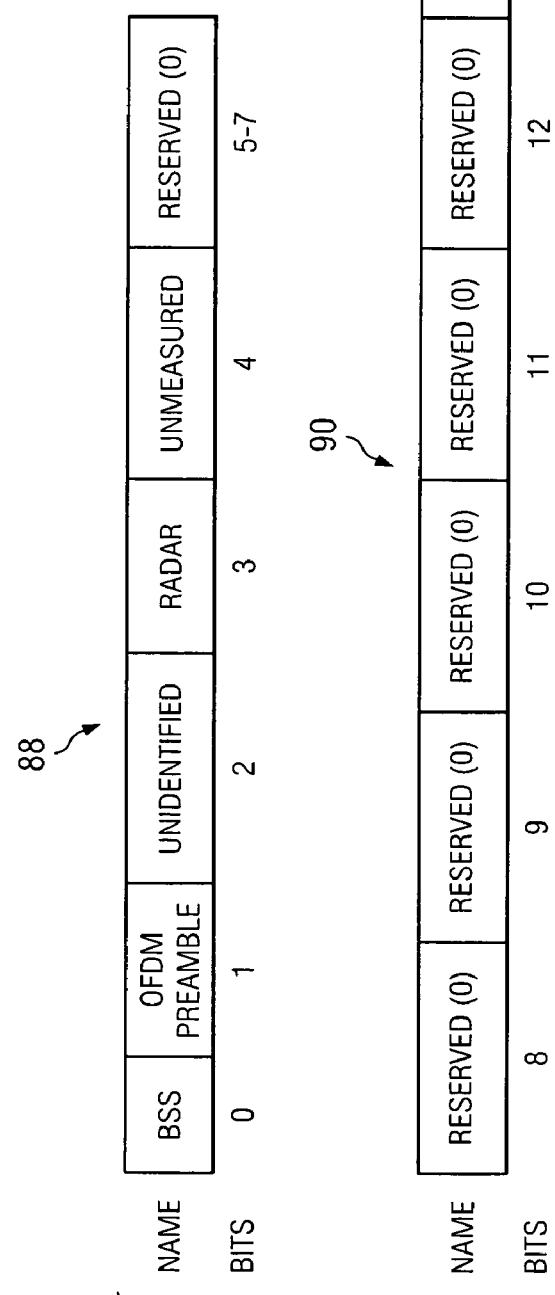
FIG. 18 is a diagram illustrating a Basic report (Map field) according to one embodiment of the present invention.

FIG. 18 is a diagram illustrating a Basic report (Map field) 88 according to one embodiment of the present invention. Basic report (Map field) 88 can be seen to include one more byte 90 in the map field in which all bits in the new byte 90 are reserved. These bits may be used for new information that becomes relevant when using these mechanisms in other regulatory domains and frequency bands and for other purposes.

The present inventor alone recognized the need to extend the supported channel element, and all related formats (DFS ones). The present inventor further recognized that either a "formula approach" or a "table approach" could be employed to implement the extended supported channel element, and all its related formats. The two approaches can be implemented as described herein below.

1. Formula approach: extend the 5 MHz*N formula used in the IEEE 802.11h standard, for the new bands. This requires adding negative N's and offsets (different for each band); and recognize that any approach implemented today might need to be changed when new bands are opened.
2. Table approach: define for each band (sub-band, e.g. there might be 3-4 bands in the 5 GHz band including Japan), a table of channel numbers. Then, using the band number and channel number, one can precisely define each frequency, with no problems for offsets; and new bands and frequencies can be added very easily. This approach may require sufficient memory for storing these tables; but if the channel numbers are selected wisely, in a systematic way, the implementation need not hold the table, but instead can use a formula to calculate the frequency based on the band (stored in the associated device), and channel number.

According to one embodiment, the table approach defines 1) a 2.4 GHz band, that currently allows numbers; 2) a U-NII US (lower, middle, upper) 5 band, that currently allows only the defined channels in the 0-200 range with the 5*N formula; and 3) a Japanese 5 band (inc. 4.9), that uses a 2.5 MHz offset. Optionally, a different split might be: lower 5 (inc. 4.9), upper 5, and the like. It is only important to have enough band IDs to accommodate future needs (different band IDs do not have to be different frequency bands, but also new channel numbers for the same band, as in the Japanese band), and enough channels. The present inventor believes one byte for band ID and channel numbers 0-255 are sufficient to implement the most preferred embodiments.

In view of the above, it can be seen the present invention presents a significant advancement in the mechanisms for dynamic frequency selection and transmit power control that may be used to provide forward compatibility hooks within IEEE 802.11h. It should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow.

What is claimed is:

1. A method of implementing forward compatibility hooks within 802.11h communication systems comprising:
    formatting at least one 802.11h symbol field in an 802.11h format, the at least one 802.11h symbol field selected from the group consisting of a supported channels element, a channel switch announcement element, a basic/CCA/RPI histogram request, and a basic/CCA/RPI histogram response; and
    inserting, in the 802.11h format, a band field, wherein the band field indicates frequency bands to which a channel number in the 802.11h symbol field refers.

2. The method according to claim 1, wherein the formatting at least one 802.11h symbol field comprises extending an 802.11h algorithm, wherein the extended 802.11h algorithm is defined by a 5 MHz*N formula, wherein N is an offset, and further wherein extending the 802.11h algorithm comprises adding negative N's.

3. The method according to claim 1, wherein the formatting at least one 802.11h symbol field comprises the steps of:
    providing a table defining channel numbers for each desired band; and defining each frequency in response to a band number and an associated channel number.

4. The method according to claim 3, wherein the desired bands are defined as a 2.4 MHz band, a U-NII US lower, middle and upper band, and a Japanese band having a center frequency at 4.9 GHz.

5. The method according to claim 1, wherein the formatting at least one 802.11h symbol field comprises formatting the 802.11h supported channels element to include a one octet band field.

6. The method according to claim 5, wherein the one octet band field has only the value "5", indicating the 5 GHz band.

7. The method according to claim 1, wherein the formatting at least one 802.11h symbol field comprises formatting the 802.11h channel switch announcement element to include a one octet new band field.

8. The method according to claim 7, wherein the one octet channel switch announcement element new band field has only the value "5", indicating the 5 GHz band.

9. The method according to claim 1, wherein the formatting at least one 802.11h symbol field comprises formatting the 802.11h basic request element to include a one octet band field.

10. The method according to claim 9, wherein the one octet basic request element band field has only the value "5", indicating the 5 GHz band.

11. The method according to claim 1, wherein the formatting at least one 802.11h symbol field comprises formatting the 802.11h CCA request element to include a one octet band field.

12. The method according to claim 11, wherein the one octet CCA request element band field has only the value "5", indicating the 5 GHz band.

13. The method according to claim 1, wherein the formatting at least one 802.11h symbol field comprises formatting the 802.11h RPI histogram request element to include a one octet band field.

14. The method according to claim 13, wherein the one octet RPI histogram request element band field has only the value "5", indicating the 5 GHz band.

15. The method according to claim 1, wherein the formatting at least one 802.11h symbol field comprises formatting the 802.11h basic response element to include a one octet band field.

16. The method according to claim 15, wherein the one octet basic response element band field has only the value "5", indicating the 5 GHz band.

17. The method according to claim 1, wherein the formatting at least one 802.11h symbol field comprises formatting the 802.11h CCA response element to include a one octet band field.

18. The method according to claim 17, wherein the one octet CCA response element band field has only the value "5", indicating the 5 GHz band.

19. The method according to claim 1, wherein the formatting at least one 802.11h symbol field comprises formatting the 802.11h RPI histogram response element to include a one octet band field.

20. The method according to claim 19, wherein the one octet RPI histogram response element band field has only the value "5", indicating the 5 GHz band.

21. The method according to claim 1, wherein the formatting at least one 802.11h symbol field comprises formatting the 802.11h basic report element to include one additional byte in its map field.

22. The method according to claim 21, wherein the one additional byte comprises solely reserved bits.

23. The method according to claim 21, wherein the one additional byte comprises bits that deliver new information that becomes relevant when using DFS and/or TPC mechanisms in other regulatory domains and other frequency bands and for other purposes.

24. A method of implementing forward compatibility hooks within 802.11h communication systems comprising:
using a same formatting of 802.11h symbol field selected from the group consisting of a supported channels element, a channel switch announcement element, a basic/CCA/RPI histogram request, and a basic/CCA/RPI histogram response, and
inserting, in the same formatting, a band field, wherein the band field indicates new frequency bands to which a channel number in the 802.11h symbol field refers.

25. The method according to claim 24, wherein the new frequency bands comprise the 2.4 GHz ISM band.

26. The method according to claim 24, wherein the using the same 802.11h symbol field comprises using the same supported channels element with the same 26 byte supported channels field wherein these bytes are used to map channels in the new frequency bands.

27. The method according to claim 26, wherein the new frequency bands comprise the 2.4 GHz band.

28. The method according to claim 24, wherein the using the same 802.11h symbol field comprises using the same channel switch announcement element with the same 1 octet channel number field wherein this octet is used to map channels in the new frequency bands.

29. The method according to claim 28, wherein the new frequency bands comprise the 2.4 GHz band.

30. The method according to claim 24, wherein the using the same 802.11h symbol field comprises using the same basic request element with the same 1 octet channel number field wherein this octet is used to map channels in the new frequency bands.

31. The method according to claim 30, wherein the new frequency bands comprise the 2.4 GHz band.

32. The method according to claim 24, wherein the using the same 802.11h symbol field comprises using the same basic response element with the same 1 octet channel number field wherein this octet is used to map channels in the new frequency bands.

33. The method according to claim 32, wherein the new frequency bands comprise the 2.4 GHz band.

34. The method according to claim 24, wherein the using the same 802.11h symbol field comprises using the same CCA request element with the same 1 octet channel number field wherein this octet is used to map channels in the new frequency bands.

35. The method according to claim 34, wherein the new frequency bands comprise the 2.4 GHz band.

36. The method according to claim 24, wherein the using the same 802.11h symbol field comprises using the same CCA response element with the same 1 octet channel number field wherein this octet is used to map channels in the new frequency bands.

37. The method according to claim 36, wherein the new frequency bands comprise the 2.4 GHz band.

38. The method according to claim 24, wherein the using the same 802.11h symbol field comprises using the same RPI histogram request element with the same 1 octet channel number field wherein this octet is used to map channels in the new frequency bands.

39. The method according to claim 38, wherein the new frequency bands comprise the 2.4 GHz band.

40. The method according to claim 24, wherein the using the same 802.11h symbol field comprises using the same RPI histogram response element with the same 1 octet channel number field wherein this octet is used to map channels in the new frequency bands.

41. The method according to claim 40, wherein the new frequency bands comprise the 2.4 GHz band.

42. The method according to claim 24, wherein the using the same 802.11h symbol field comprises using the same basic response element with the same basic report map field wherein this field is used for indications in the new frequency bands.

43. The method according to claim 42, wherein the new frequency bands comprise the 2.4 GHz band.

* * * * *